US012812156B2

(12) United States Patent
Wang

(10) Patent No.: US 12,812,156 B2
(45) Date of Patent: Nov. 24, 2026

(54) OUTPUT OF PRIOR PICTURES FOR PICTURES STARTING A NEW CODED VIDEO SEQUENCE IN VIDEO CODING

(71) Applicant: Huawei Technologies Co., Ltd., Shenzhen (CN)

(72) Inventor: Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/212,893

(22) Filed: May 20, 2025

(65) Prior Publication Data

US 2025/0350755 A1 Nov. 13, 2025

Related U.S. Application Data

(63) Continuation of application No. 18/419,243, filed on Jan. 22, 2024, now Pat. No. 12,348,755, which is a
(Continued)

(51) Int. Cl.
*H04N 19/46* (2014.01)
*H04N 19/159* (2014.01)
(Continued)

(52) U.S. Cl.
CPC ........... *H04N 19/46* (2014.11); *H04N 19/159* (2014.11); *H04N 19/172* (2014.11); *H04N 19/176* (2014.11); *H04N 19/188* (2014.11)

(58) Field of Classification Search
CPC .. H04N 19/577; H04N 19/105; H04N 19/159; H04N 19/176; H04N 19/46;
(Continued)

(56) References Cited

U.S. PATENT DOCUMENTS 9,866,852 B2 1/2018 Ramasubramonian et al.
11,558,630 B2 1/2023 Choi et al.
(Continued)

FOREIGN PATENT DOCUMENTS

JP 2015515239 A 5/2015
JP 2016518041 A 6/2016
JP 2017507542 A 3/2017

OTHER PUBLICATIONS

Document: JVET-O0151-v1, Wang, Y.K., et al., "AHG17: On no_output_of_prior_pics_flag", Joint Video Experts Team (JVET) of ITU-T SG 16 WP 3 and ISO/IEC JTC 1/SC 29/WG 11, 15th Meeting: Gothenburg, SE, Jul. 3-12, 2019, 3 pages.
(Continued)

*Primary Examiner* — Marnie A Matt
(74) *Attorney, Agent, or Firm* — Conley Rose, P.C.

(57) ABSTRACT

A method of decoding a coded video bitstream is provided. The method includes receiving the coded video bitstream, wherein the coded video bitstream contains a gradual decoding refresh (GDR) picture and a first flag having a first value; setting a second value of a second flag equal to the first value of the first flag; emptying any previously-decoded pictures from a decoded picture buffer (DPB) based on the second flag having the second value; and decoding a current picture after the DPB has been emptied. A corresponding method of encoding is also provided.

20 Claims, 10 Drawing Sheets

Related U.S. Application Data continuation of application No. 17/518,265, filed on Nov. 3, 2021, now Pat. No. 11,895,312, which is a continuation of application No. PCT/US2020/030951, filed on May 1, 2020.

(60) Provisional application No. 62/843,991, filed on May 6, 2019.

(51) Int. Cl.

| | |
|---|---|
| ***H04N 19/169*** | (2014.01) |
| ***H04N 19/172*** | (2014.01) |
| ***H04N 19/176*** | (2014.01) |

(58) Field of Classification Search

CPC ...... H04N 19/59; H04N 19/11; H04N 19/172; H04N 19/30; H04N 19/587; H04N 19/70

USPC ...................................................... 375/240.12

See application file for complete search history.

(56) References Cited

U.S. PATENT DOCUMENTS

| | | | | |
|---|---|---|---|---|
| 11,895,312 | B2 | 2/2024 | Wang | |
| 2008/0205511 | A1 | 8/2008 | Hannuksela | |
| 2013/0077681 | A1 | 3/2013 | Chen et al. | |
| 2013/0107953 | A1* | 5/2013 | Chen .................... | H04N 19/423 375/E7.243 |
| 2013/0294499 | A1 | 11/2013 | Wang | |
| 2013/0294500 | A1 | 11/2013 | Wang | |
| 2014/0086336 | A1 | 3/2014 | Wang | |
| 2014/0092963 | A1 | 4/2014 | Wang | |
| 2014/0301477 | A1 | 10/2014 | Deshpande | |
| 2014/0355692 | A1* | 12/2014 | Ramasubramonian ...................... | H04N 19/597 375/240.26 |
| 2015/0195545 | A1 | 7/2015 | Wang et al. | |
| 2016/0112712 | A1 | 4/2016 | Wang | |
| 2016/0173887 | A1 | 6/2016 | Deshpande | |
| 2017/0105027 | A1 | 4/2017 | Deshpande | |
| 2017/0353718 | A1 | 12/2017 | Rodriguez | |
| 2021/0368196 | A1* | 11/2021 | Choi ...................... | H04N 19/11 |
| 2021/0368208 | A1 | 11/2021 | Samuelsson et al. | |
| 2023/0038756 | A1 | 2/2023 | Choi et al. | |

OTHER PUBLICATIONS

Document: JVET-N1001-v3, Bross, B, et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, 371 pages.

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

"High Efficiency Video Coding," Series H: Audiovisual and Multimedia Systems Infrastructure of Audiovisual Services—Coding of Moving Video, ITU-T H.265, Dec. 2016, 664 pages.

"Line Transmission of Non-Telephone Signals, Video Codec for Audiovisual Services at p x 64 kbits," ITU-T Recommendation H.261, Mar. 3, 1993, 29 pages.

"Transmission of Non-Telephone Signals, Information Technology—Generic Coding of Moving Pictures and Associated Audio Information: Video," ITU-T H.262, Jul. 1995, 211 pages.

"Video Coding for Low Bit Rate Communication," Series H: Audiovisual and Multimedia Systems Infrastructure of Audiovisual Services—Coding of Moving Video, ITU-T H.263, Jan. 2005, 226 pages.

Bross, et al., "Versatile Video Coding (Draft 3)," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v1, 350 pages.

"Multiplexing Protocol for Low Bit Rate Multimedia Communication," Series H: Audiovisual and Multimedia Systems Infrastructure of Audiovisual Services—Transmission Multiplexing and Synchronization, ITU-T H.223, Jul. 2001, 74 pages.

* cited by examiner

OUTPUT OF PRIOR PICTURES FOR PICTURES STARTING A NEW CODED VIDEO SEQUENCE IN VIDEO CODING

CROSS-REFERENCE TO RELATED APPLICATIONS

This application is a continuation of U.S. patent application Ser. No. 18/419,243 filed on Jan. 22, 2024, which is a continuation of U.S. patent application Ser. No. 17/518,265 filed on Nov. 3, 2021, now U.S. Pat. No. 11,895,312, which is a continuation of International Application No. PCT/US2020/030951 filed on May 1, 2020, which claims the benefit of U.S. Provisional Patent Application No. 62/843,991 filed May 6, 2019, all of which are hereby incorporated by reference in their entireties.

TECHNICAL FIELD

In general, this disclosure describes techniques supporting the output of previously-decoded pictures in video coding. More specifically, this disclosure allows previously-decoded pictures corresponding to a random access point picture starting a coded video sequence (CVS) to be output from a decoded picture buffer (DPB).

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding implemented by a video decoder. The method includes receiving, by the video decoder, the coded video bitstream, wherein the coded video bitstream contains a gradual decoding refresh (GDR) picture and a first flag having a first value; setting, by the video decoder, a second value of a second flag equal to the first value of the first flag; emptying, by the video decoder, any previously-decoded pictures from a decoded picture buffer (DPB) based on the second flag having the second value after the GDR picture has been decoded; and decoding, by the video decoder, a current picture after the DPB has been emptied.

The method provides techniques for the output of prior pictures (e.g., previously-decoded pictures) in a decoded picture buffer (DPB) when a random access point picture (e.g., a clean random access (CRA) picture, a gradual random access (GRA) picture, or gradual decoding refresh (GDR) picture, a CVSS picture, etc.) other than an instantaneous decoder refresh (IDR) picture is encountered in decoding order. Emptying the previously-decoded pictures from the DPB when the random access point picture is reached prevents the DPB from overflowing and promotes a more continuous playback. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the GDR picture is not a first picture of the coded video bitstream, and wherein the first value of the flag is one.

Optionally, in any of the preceding aspects, another implementation of the aspect provides that the GDR picture is disposed in a video coding layer (VCL) network abstraction layer (NAL) unit having a gradual decoding refresh (GDR) network abstraction layer (NAL) unit type (GDR_NUT).

Optionally, in any of the preceding aspects, another implementation of the aspect provides that the first flag is designated as no_output_of_prior_pics_flag and the second flag is designated as NoOutputOfPriorPicsFlag.

Optionally, in any of the preceding aspects, another implementation of the aspect provides setting a DPB fullness parameter to zero when the first flag is set to the first value.

Optionally, in any of the preceding aspects, another implementation of the aspect provides that the DPB is emptied after the GDR picture has been decoded.

Optionally, in any of the preceding aspects, another implementation of the aspect provides that displaying an image generated based on the current picture.

A second aspect relates to a method of encoding implemented by a video encoder. The method includes determining, by the video encoder, a random access point for a video sequence; encoding, by the video encoder, a gradual decoding refresh (GDR) picture into the video sequence at the random access point; setting, by the video encoder, a flag to a first value to instruct a video decoder to empty any previously-decoded pictures from a decoded picture buffer (DPB); generating, by the video encoder, a video bitstream containing the video sequence having the GDR picture at the random access point and the flag; and storing, by the video encoder, the video bitstream for transmission toward the video decoder.

The method provides techniques for the output of prior pictures (e.g., previously-decoded pictures) in a decoded picture buffer (DPB) when a random access point picture (e.g., a clean random access (CRA) picture, a gradual random access (GRA) picture, or gradual decoding refresh (GDR) picture, a CVSS picture, etc.) other than an instantaneous decoder refresh (IDR) picture is encountered in decoding order. Emptying the previously-decoded pictures from the DPB when the random access point picture is reached prevents the DPB from overflowing and promotes a more continuous playback. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the GDR picture is not a first picture of the video bitstream, and wherein the video decoder is instructed to empty the DPB after the GDR picture has been decoded Optionally, in any of the preceding aspects, another implementation of the aspect provides that the GDR picture is disposed in a video coding layer (VCL) network abstraction layer (NAL) unit having a gradual decoding refresh (GDR) network abstraction layer (NAL) unit type (GDR_NUT).

Optionally, in any of the preceding aspects, another implementation of the aspect provides instructing the video decoder to set a DPB fullness parameter to zero when the flag is set to the first value.

Optionally, in any of the preceding aspects, another implementation of the aspect provides that the flag is designated as no_output_of_prior_pics_flag.

Optionally, in any of the preceding aspects, another implementation of the aspect provides that the first value of the flag is one.

A third aspect relates to a decoding device. The decoding device includes a receiver configured to receive a coded video bitstream; a memory coupled to the receiver, the memory storing instructions; and a processor coupled to the memory, the processor configured to execute the instructions to cause the decoding device to: receive the coded video bitstream, wherein the coded video bitstream contains a gradual decoding refresh (GDR) picture and a first flag having a first value; set a second value of a second flag equal to the first value of the first flag; empty any previously-decoded pictures from a decoded picture buffer (DPB) based on the second flag having the second value; and decode a current picture after the DPB has been emptied.

The decoding device provides techniques for the output of prior pictures (e.g., previously-decoded pictures) in a decoded picture buffer (DPB) when a random access point picture (e.g., a clean random access (CRA) picture, a gradual random access (GRA) picture, or gradual decoding refresh (GDR) picture, a CVSS picture, etc.) other than an instantaneous decoder refresh (IDR) picture is encountered in decoding order. Emptying the previously-decoded pictures from the DPB when the random access point picture is reached prevents the DPB from overflowing and promotes a more continuous playback. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the GDR picture is not a first picture of the coded video bitstream.

Optionally, in any of the preceding aspects, another implementation of the aspect provides that the first flag is designated as no_output_of_prior_pics_flag, and wherein the second flag is designated as NoOutputOfPriorPicsFlag.

Optionally, in any of the preceding aspects, another implementation of the aspect provides a display configured to display an image as generated based on the current picture.

A fourth aspect relates to an encoding device. The encoding device includes a memory containing instructions; a processor coupled to the memory, the processor configured to implement the instructions to cause the encoding device to: determine a random access point for a video sequence; encode a gradual decoding refresh (GDR) picture into the video sequence at the random access point; set a flag to a first value to instruct a video decoder to empty any previously-decoded pictures from a decoded picture buffer (DPB); and generate the video bitstream containing the video sequence having the GDR picture at the random access point and the flag; and a transmitter coupled to the processor, the transmitter configured to transmit the video bitstream toward a video decoder.

The encoding device provides techniques for the output of prior pictures (e.g., previously-decoded pictures) in a decoded picture buffer (DPB) when a random access point picture (e.g., a clean random access (CRA) picture, a gradual random access (GRA) picture, or gradual decoding refresh (GDR) picture, a CVSS picture, etc.) other than an instantaneous decoder refresh (IDR) picture is encountered in decoding order. Emptying the previously-decoded pictures from the DPB when the random access point picture is reached prevents the DPB from overflowing and promotes a more continuous playback. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the GDR picture is not a first picture of the video bitstream.

Optionally, in any of the preceding aspects, another implementation of the aspect provides that the flag is designated as no_output_of_prior_pics_flag.

Optionally, in any of the preceding aspects, another implementation of the aspect provides that the memory stores the bitstream prior to the transmitter transmitting the bitstream toward the video decoder.

A fifth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform any of the methods disclosed herein.

The coding apparatus provides techniques for the output of prior pictures (e.g., previously-decoded pictures) in a decoded picture buffer (DPB) when a random access point picture (e.g., a clean random access (CRA) picture, a gradual random access (GRA) picture, or gradual decoding refresh (GDR) picture, a CVSS picture, etc.) other than an instantaneous decoder refresh (IDR) picture is encountered in decoding order. Emptying the previously-decoded pictures from the DPB when the random access point picture is reached prevents the DPB from overflowing and promotes a more continuous playback. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides a display configured to display an image.

A sixth aspect relates to a system. The system includes an encoder; and a decoder in communication with the encoder, wherein the encoder or the decoder includes the decoding device, the encoding device, or the coding apparatus disclosed herein.

The system provides techniques for the output of prior pictures (e.g., previously-decoded pictures) in a decoded picture buffer (DPB) when a random access point picture (e.g., a clean random access (CRA) picture, a gradual random access (GRA) picture, or gradual decoding refresh (GDR) picture, a CVSS picture, etc.) other than an instantaneous decoder refresh (IDR) picture is encountered in decoding order. Emptying the previously-decoded pictures from the DPB when the random access point picture is reached prevents the DPB from overflowing and promotes a more continuous playback. Thus, the coder/decoder (a.k.a., "codec") in video coding is improved relative to current codecs. As a practical matter, the improved video coding process offers the user a better user experience when videos are sent, received, and/or viewed.

A seventh aspect relates to a means for coding. The means for coding comprises receiving means configured to receive a picture to encode or to receive a bitstream to decode; transmission means coupled to the receiving means, the transmission means configured to transmit the bitstream to a decoding means or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

The means for coding provides techniques for the output of prior pictures (e.g., previously-decoded pictures) in a decoded picture buffer (DPB) when a random access point picture (e.g., a clean random access (CRA) picture, a gradual random access (GRA) picture, or gradual decoding refresh (GDR) picture, a CVSS picture, etc.) other than an instantaneous decoder refresh (IDR) picture is encountered in decoding order. Emptying the previously-decoded pictures from the DPB when the random access point picture is reached prevents the DPB from overflowing and promotes a more continuous playback. Thus, the coder/decoder (a.k.a., "codec") in video coding is improved relative to current codecs. As a practical matter, the improved video coding process offers the user a better user experience when videos are sent, received, and/or viewed.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
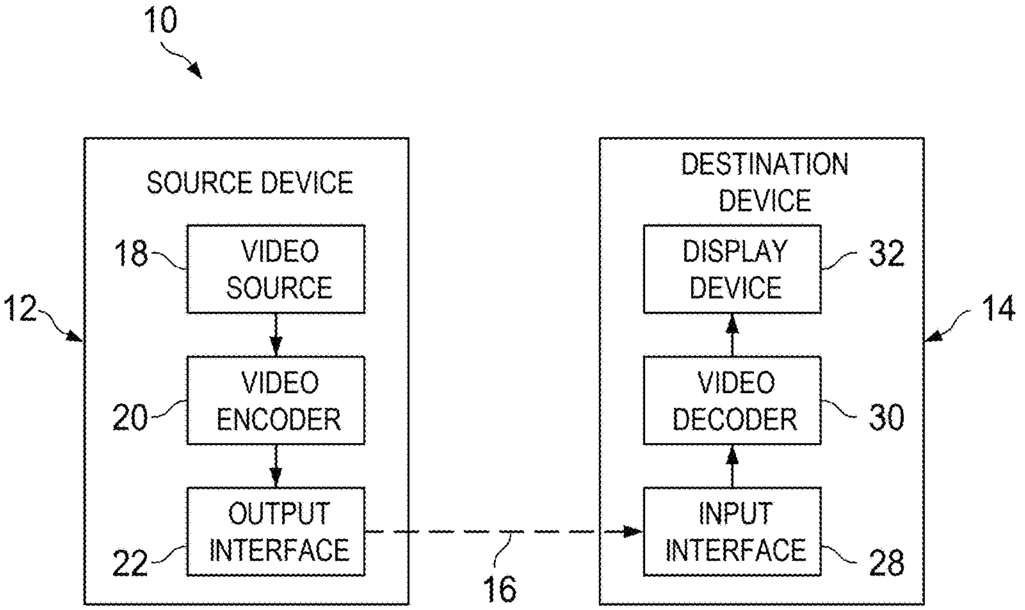
FIG. 1 is a block diagram illustrating an example coding system that may utilize GDR techniques.

FIG. 1 is a block diagram illustrating an example coding system 10 that may utilize video coding techniques as described herein. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD) s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of the source device 12 and/or the video decoder 30 of the destination device 14 may be configured to apply the techniques for video coding. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for video coding may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Moving Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
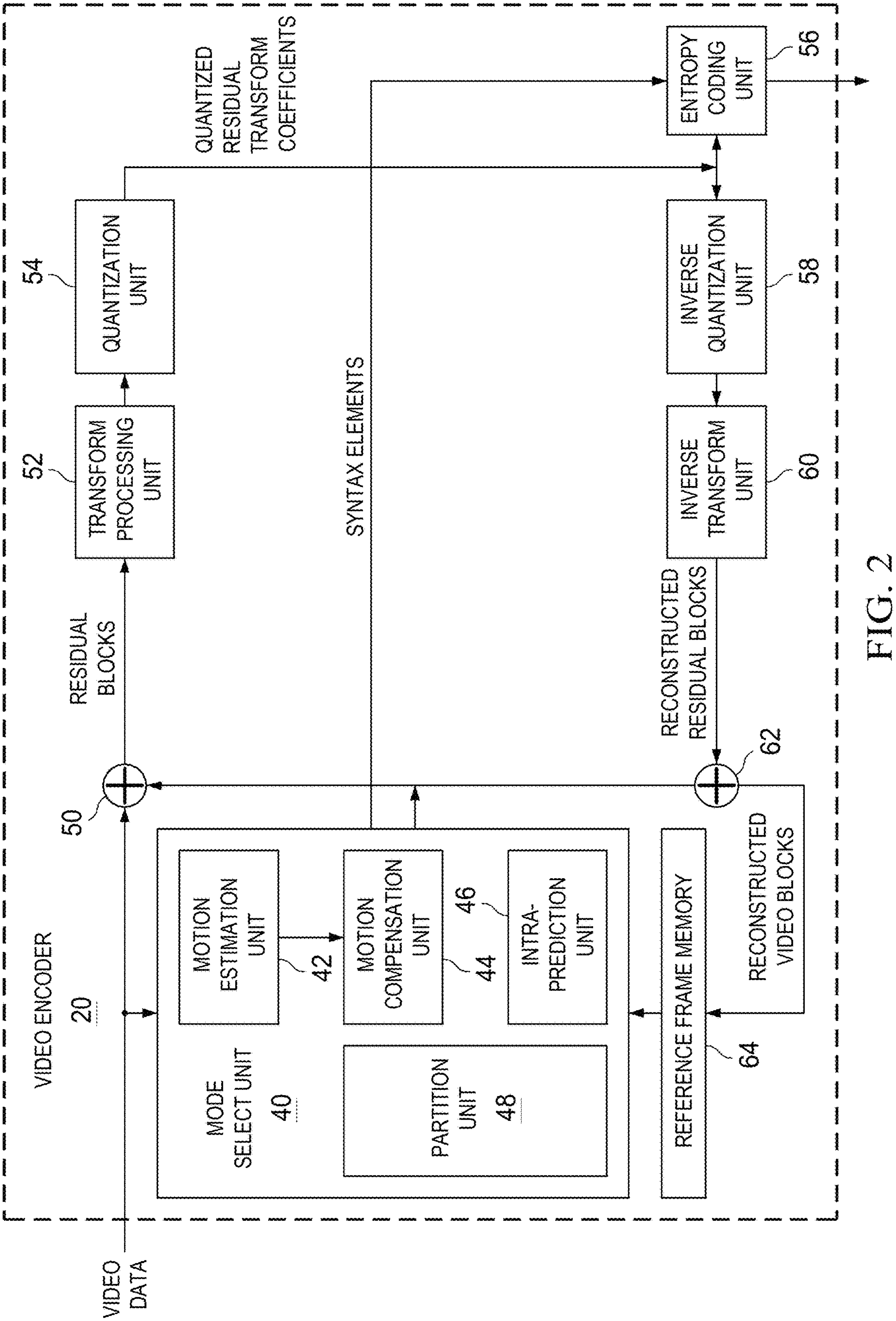
FIG. 2 is a block diagram illustrating an example video encoder that may implement GDR techniques.

FIG. 2 is a block diagram illustrating an example of video encoder 20 that may implement video coding techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional (a.k.a., uni prediction) prediction (P mode) or bi-prediction (a.k.a., bi prediction) (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction (a.k.a., intra prediction) unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the tree block with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction (a.k.a., inter prediction) mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
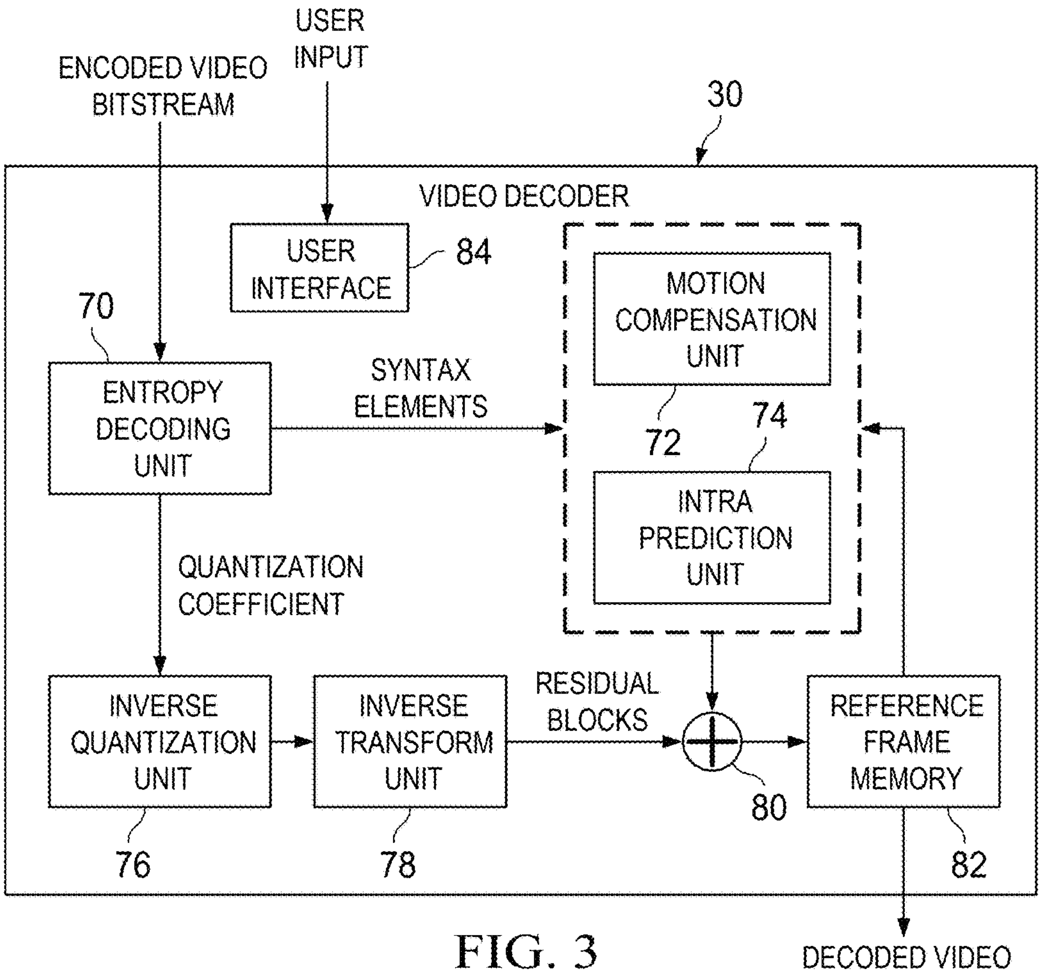
FIG. 3 is a block diagram illustrating an example of a video decoder that may implement GDR techniques.

FIG. 3 is a block diagram illustrating an example of video decoder 30 that may implement video coding techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of the video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

In an embodiment, the video decoder 30 includes a user interface (UI) 84. The user interface 84 is configured to receive input from a user of the video decoder 30 (e.g., a network administrator). Through the user interface 84, the user is able to manage or change settings on the video decoder 30. For example, the user is able to input or otherwise provide a value for a parameter (e.g., a flag) in order to control the configuration and/or operation of the video decoder 30 according the user's preference. The user interface 84 may be, for example, a graphical user interface (GUI) that allows a user to interact with the video decoder 30 through graphical icons, drop-down menus, check boxes, and so on. In some cases, the user interface 84 may receive information from the user via a keyboard, a mouse, or other peripheral device. In an embodiment, a user is able to access the user interface 84 via a smart phone, a tablet device, a personal computer located remotely from the video decoder 30, and so on. As used herein, the user interface 84 may be referred to as an external input or an external means.

Keeping the above in mind, video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Image and video compression has experienced rapid growth, leading to various coding standards. Such video coding standards include ITU-T H.261, International Organization for Standardization/International Electrotechnical Commission (ISO/IEC) MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (JVET) of ITU-T and ISO/IEC. While the VVC standard has several working drafts, one Working Draft (WD) of VVC in particular, namely B. Bross, J. Chen, and S. Liu, "Versatile Video Coding (Draft 5)," JVET-N1001-v3, 13th JVET Meeting, Mar. 27, 2019 (VVC Draft 5) is referenced herein.

The description of the techniques disclosed herein are based on the under-development video coding standard Versatile Video Coding (VVC) by the joint video experts team (JVET) of ITU-T and ISO/IEC. However, the techniques also apply to other video codec specifications.

Figure 4:
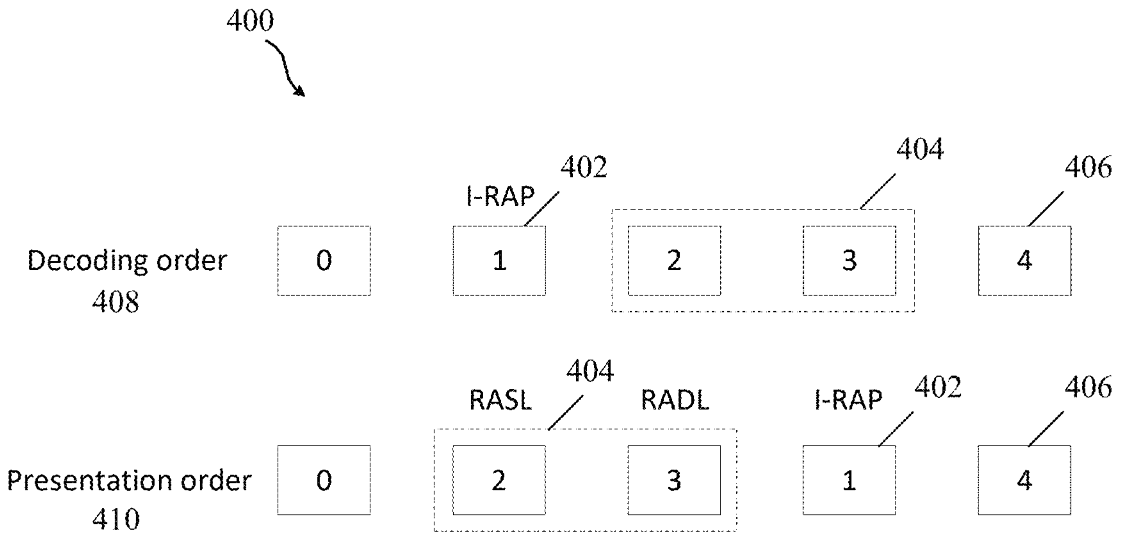
FIG. 4 is a representation of a relationship between an IRAP picture relative to leading pictures and trailing pictures in a decoding order and a presentation order.

FIG. 4 is a representation 400 of a relationship between an intra random access picture (IRAP) picture 402 relative to leading pictures 404 and trailing pictures 406 in a decoding order 408 and a presentation order 410. In an embodiment, the IRAP picture 402 is referred to as a clean random access (CRA) picture or as an instantaneous decoder refresh (IDR) picture with random access decodable (RADL) picture. In HEVC, IDR pictures, CRA pictures, and Broken Link Access (BLA) pictures are all considered IRAP pictures 402. For VVC, during the 12th JVET meeting in October 2018, it was agreed to have both IDR and CRA pictures as IRAP pictures. In an embodiment, Broken Link Access (BLA) and Gradual Decoder Refresh (GDR) pictures may also be considered to be IRAP pictures. The decoding process for a coded video sequence always starts at an IRAP.

A CRA picture is an IRAP picture for which each video coding layer (VCL) network abstraction layer (NAL) unit has nal_unit_type equal to CRA_NUT. A CRA picture does not refer to any pictures other than itself for inter prediction in its decoding process, and may be the first picture in the bitstream in decoding order, or may appear later in the bitstream. A CRA picture may have associated RADL or random access skipped leading (RASL) pictures. When a CRA picture has NoOutputBeforeRecoveryFlag equal to 1, the associated RASL pictures are not output by the decoder, because they may not be decodable, as they may contain references to pictures that are not present in the bitstream.

As shown in FIG. 4, the leading pictures 404 (e.g., pictures 2 and 3) follow the IRAP picture 402 in the decoding order 408, but precede the IRAP picture 402 in the presentation order 410. The trailing picture 406 follows the IRAP picture 402 in both the decoding order 408 and in the presentation order 410. While two leading pictures 404 and one trailing picture 406 are depicted in FIG. 4, those skilled in the art will appreciate that more or fewer leading pictures 404 and/or trailing pictures 406 may be present in the decoding order 408 and the presentation order 410 in practical applications.

The leading pictures 404 in FIG. 4 have been divided into two types, namely random access skipped leading (RASL) and RADL. When decoding starts with the IRAP picture 402 (e.g., picture 1), the RADL picture (e.g., picture 3) can be properly decoded; however, the RASL picture (e.g., picture 2) cannot be properly decoded. Thus, the RASL picture is discarded. In light of the distinction between RADL and RASL pictures, the type of leading picture 404 associated with the IRAP picture 402 should be identified as either RADL or RASL for efficient and proper coding. In HEVC, when RASL and RADL pictures are present, it is constrained that for RASL and RADL pictures that are associated with the same IRAP picture 402, the RASL pictures shall precede the RADL pictures in presentation order 410.

An IRAP picture 402 provides the following two important functionalities/benefits. Firstly, the presence of an IRAP picture 402 indicates that the decoding process can start from that picture. This functionality allows a random access feature in which the decoding process starts at that position in the bitstream, not necessarily the beginning of the bitstream, as long as an IRAP picture 402 is present at that position. Secondly, the presence of an IRAP picture 402 refreshes the decoding process such that a coded picture starting at the IRAP picture 402, excluding RASL pictures, are coded without any reference to previous pictures. Having an IRAP picture 402 present in the bitstream consequently would stop any error that may happen during decoding of coded pictures prior to the IRAP picture 402 to propagate to the IRAP picture 402 and those pictures that follow the IRAP picture 402 in decoding order 408.

While IRAP pictures 402 provide important functionalities, they come with a penalty to the compression efficiency. The presence of an IRAP picture 402 causes a surge in bitrate. This penalty to the compression efficiency is due to two reasons. Firstly, as an IRAP picture 402 is an intra-predicted picture, the picture itself would require relatively more bits to represent when compared to other pictures (e.g., leading pictures 404, trailing pictures 406) that are inter-predicted pictures. Secondly, because the presence of an IRAP picture 402 breaks temporal prediction (this is because the decoder would refresh the decoding process, in which one of the actions of the decoding process for this is to remove previous reference pictures in the decoded picture buffer (DPB)), the IRAP picture 402 causes the coding of pictures that follow the IRAP picture 402 in decoding order 408 to be less efficient (i.e., needs more bits to represent) because they have less reference pictures for their inter-prediction coding.

Among the picture types that are considered IRAP pictures 402, the IDR picture in HEVC has different signaling and derivation when compared to other picture types. Some of the differences are as follows.

For signaling and derivation of a picture order count (POC) value of an IDR picture, the most significant bit (MSB) part of the POC is not derived from the previous key picture but simply set to be equal to 0.

For signaling information needed for reference picture management, the slice header of an IDR picture does not contain information needed to be signaled to assist reference picture management. For other picture types (i.e., CRA, Trailing, temporal sub-layer access (TSA), etc.), information such as the reference picture set (RPS) described below or other forms of similar information (e.g., reference picture lists) are needed for the reference pictures marking process (i.e., the process to determine the status of reference pictures in the decoded picture buffer (DPB), either used for reference and unused for reference). However, for the IDR picture, such information does not need to be signaled because the presence of IDR indicates that the decoding process shall simply mark all reference pictures in the DPB as unused for reference.

In HEVC and VVC, IRAP pictures 402 and leading pictures 404 may each be contained within a single network abstraction layer (NAL) unit. A set of the NAL units may be referred to as an access unit. IRAP pictures 402 and leading pictures 404 are given different NAL unit types so that they can be easily identified by system level applications. For example, a video splicer needs to understand coded picture types without having to understand too much detail of the syntax element in the coded bitstream, particularly to identify IRAP pictures 402 from non-IRAP pictures and to identify leading pictures 404, including determining RASL and RADL pictures, from trailing pictures 406. Trailing pictures 406 are those pictures that are associated with an IRAP picture 402 and follow the IRAP picture 402 in presentation order 410. A picture may follow the particular IRAP picture 402 in decoding order 408 and precede any other IRAP picture 402 in decoding order 408. For this, giving IRAP pictures 402 and leading pictures 404 their own NAL unit type helps such applications.

For HEVC, NAL unit types for IRAP pictures include the following:

BLA with leading picture (BLA_W_LP): NAL unit of a Broken Link Access (BLA) picture that may be followed by one or more leading pictures in decoding order.

BLA with RADL (BLA_W_RADL): NAL unit of a BLA picture that may be followed by one or more RADL pictures but no RASL picture in decoding order.

BLA with no leading picture (BLA_N_LP): NAL unit of a BLA picture that is not followed by leading picture in decoding order.

IDR with RADL (IDR_W_RADL): NAL unit of an IDR picture that may be followed by one or more RADL pictures but no RASL picture in decoding order.

IDR with no leading picture (IDR_N_LP): NAL unit of an IDR picture that is not followed by leading picture in decoding order.

CRA: NAL unit of a Clean Random Access (CRA) picture that may be followed by leading pictures (i.e., either RASL pictures or RADL pictures or both).

RADL: NAL unit of a RADL picture.

RASL: NAL unit of a RASL picture.

For VVC, the NAL unit type for IRAP pictures 402 and leading pictures 404 are as follows:

IDR with RADL (IDR_W_RADL): NAL unit of an IDR picture that may be followed by one or more RADL pictures but no RASL picture in decoding order.

IDR with no leading picture (IDR_N_LP): NAL unit of an IDR picture that is not followed by leading picture in decoding order.

CRA: NAL unit of a Clean Random Access (CRA) picture that may be followed by leading pictures (i.e., either RASL pictures or RADL pictures or both).

RADL: NAL unit of a RADL picture.

RASL: NAL unit of a RASL picture.

Figure 5:
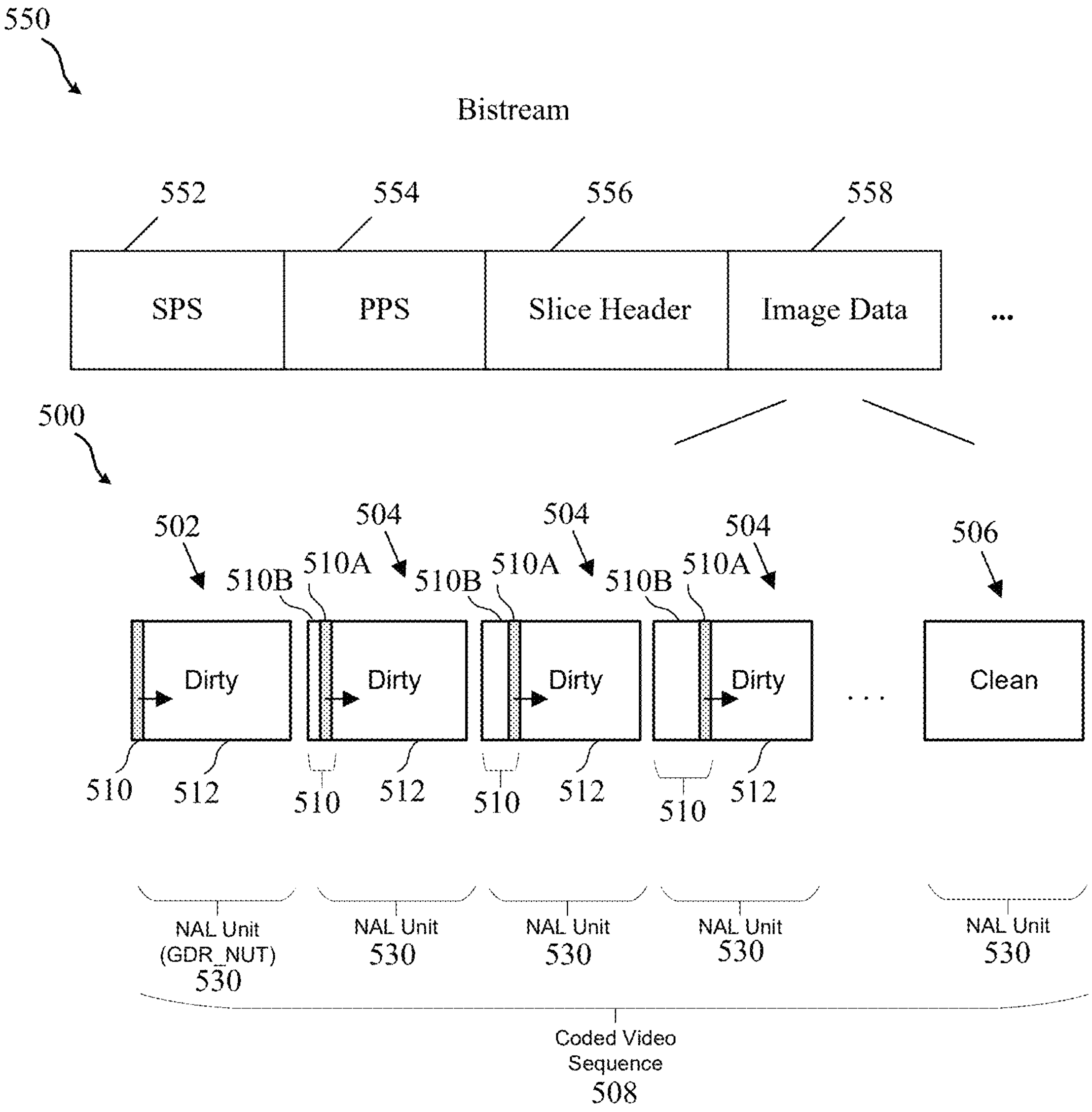
FIG. 5 illustrates a gradual decoding refresh technique.

FIG. 5 illustrates a video bitstream 550 configured to implement a gradual decoding refresh (GDR) technique 500. As used herein the video bitstream 550 may also be referred to as a coded video bitstream, a bitstream, or variations thereof. As shown in FIG. 5, the bitstream 550 comprises a sequence parameter set (SPS) 552, a picture parameter set (PPS) 554, a slice header 556, and image data 558.

The SPS 552 contains data that is common to all the pictures in a sequence of pictures (SOP). In contrast, the PPS 554 contains data that is common to the entire picture. The slice header 556 contains information about the current slice such as, for example, the slice type, which of the reference pictures will be used, and so on. The SPS 552 and the PPS 554 may be generically referred to as a parameter set. The SPS 552, the PPS 554, and the slice header 556 are types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important header data that can apply to a large number of VCL NAL units) and supplemental enhancement information (timing information and other supplemental data that may enhance usability of the decoded video signal but are not necessary for decoding the values of the samples in the video pictures). Those skilled in the art will appreciate that the bitstream 550 may contain other parameters and information in practical applications.

The image data 558 of FIG. 5 comprises data associated with the images or video being encoded or decoded. The image data 558 may be simply referred to as the payload or data being carried in the bitstream 550. In an embodiment, the image data 558 comprises the CVS 508 (or CLVS) containing a GDR picture 502, one or more trailing pictures 504, and a recovery point picture 506. In an embodiment, the GDR picture 502 is referred to as a CVS starting (CVSS) picture. The CVS 508 is a coded video sequence for every coded layer video sequence (CLVS) in the video bitstream 550. Notably, the CVS and the CLVS are the same when the video bitstream 550 includes a single layer. The CVS and the CLVS are only different when the video bitstream 550 includes multiple layers. In an embodiment, the trailing pictures 504 may be considered a form of GDR picture since they precede the recovery point picture 506 in the GDR period.

In an embodiment, the GDR picture 502, the trailing pictures 504, and the recovery point picture 506 may define a GDR period in the CVS 508. In an embodiment, a decoding order begins with the GDR picture 502, continues with the trailing pictures 504, and then proceeds to the recovery picture 506.

The CVS 508 is a series of pictures (or portions thereof) starting with the GDR picture 502 and includes all pictures (or portions thereof) up to, but not including, the next GDR picture or until the end of the bitstream. The GDR period is a series of pictures starting with the GDR picture 502 and includes all pictures up to and including the recovery point picture 506. The decoding process for the CVS 508 always starts at the GDR picture 502.

As shown in FIG. 5, the GDR technique 500 or principle works over a series of pictures starting with the GDR picture 502 and ending with the recovery point picture 506. The GDR picture 502 contains a refreshed/clean region 510 containing blocks that have all be coded using intra prediction (i.e., intra-predicted blocks) and an un-refreshed/dirty region 512 containing blocks that have all be coded using inter prediction (i.e., inter-predicted blocks).

The trailing picture 504 immediately adjacent to the GDR picture 502 contains a refreshed/clean region 510 having a first portion 510A coded using intra prediction and a second portion 510B coded using inter prediction. The second portion 510B is coded by referencing the refreshed/clean region 510 of, for example, a preceeding picture within the GDR period of the CVS 508. As shown, the refreshed/clean region 510 of the trailing pictures 504 expands as the coding process moves or progresses in a consistent direction (e.g., from left to right), which correspondingly shrinks the un-refreshed/dirty region 512. Eventually, the recovery point picture 506, which contains only the refreshed/clean region 510, is obtained from the coding process. Notably, and as will be further discussed below, the second portion 510B of the refreshed/clean region 510, which is coded as inter-predicted blocks, may only refer to the refreshed/clean region 510 in the reference picture.

As shown in FIG. 5, the GDR picture 502, the trailing pictures 504, and the recovery point picture 506 in the CVS 508 are each contained within their own VCL NAL unit 530. The set of VCL NAL units 530 in the CVS 508 may be referred to as an access unit.

In an embodiment, the VCL NAL unit 530 containing the GDR picture 502 in the CVS 508 has a GDR NAL unit type (GDR_NUT). That is, in an embodiment the VCL NAL unit 530 containing the GDR picture 502 in the CVS 508 has its own unique NAL unit type relative to the trailing pictures 504 and the recovery point picture 506. In an embodiment, the GDR_NUT permits the bitstream 550 to begin with the GDR picture 502 instead of the bitstream 550 having to begin with an IRAP picture. Designating the VCL NAL unit 530 of the GDR picture 502 as a GDR_NUT may indicate to, for example, a decoder that the initial VCL NAL unit 530 in the CVS 508 contains the GDR picture 502. In an embodiment, the GDR picture 502 is the initial picture in the CVS 508. In an embodiment, the GDR picture 502 is the initial picture in the GDR period.

Figure 6:
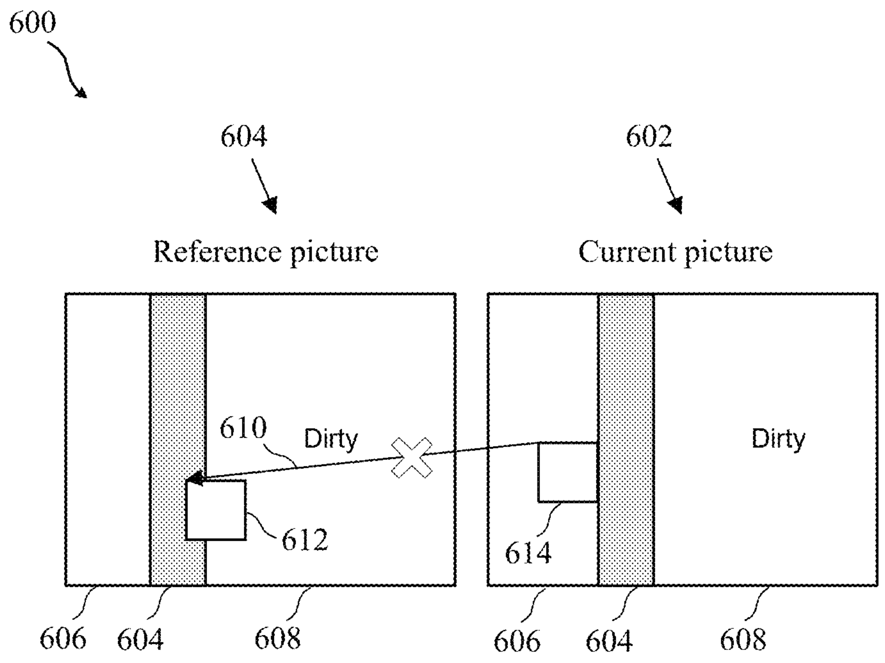
FIG. 6 is a schematic diagram illustrating an undesirable motion search.

FIG. 6 is a schematic diagram illustrating an undesirable motion search 600 when using the encoder restriction to support GDR. As shown, the motion search 600 depicts a current picture 602 and a reference picture 604. The current picture 602 and the reference picture 604 each include a refreshed region 606 coded with intra prediction, a refreshed region 608 coded with inter prediction, and an unrefreshed region 608. The refreshed region 604, the refreshed region 606, and the unrefreshed region 608 are silimiar to the the first portion 510A of the refreshed/clean region 510, the second portion 510B of the refreshed/clean region 510, and the un-refreshed/dirty region 512 in FIG. 5.

During motion search process, the encoder is constrained or prevented from selecting any motion vector 610 that results in some of the samples of the reference block 612 being located outside the refreshed region 606. This occurs even when the reference block 612 provides the best rate-distortion cost criteria when predicting the curent block 614 in the current picture 602. Thus, FIG. 6 illustrates the reason for non-optimality in the motion search 600 when using the encoder restriction for supporting GDR.

Figure 7:
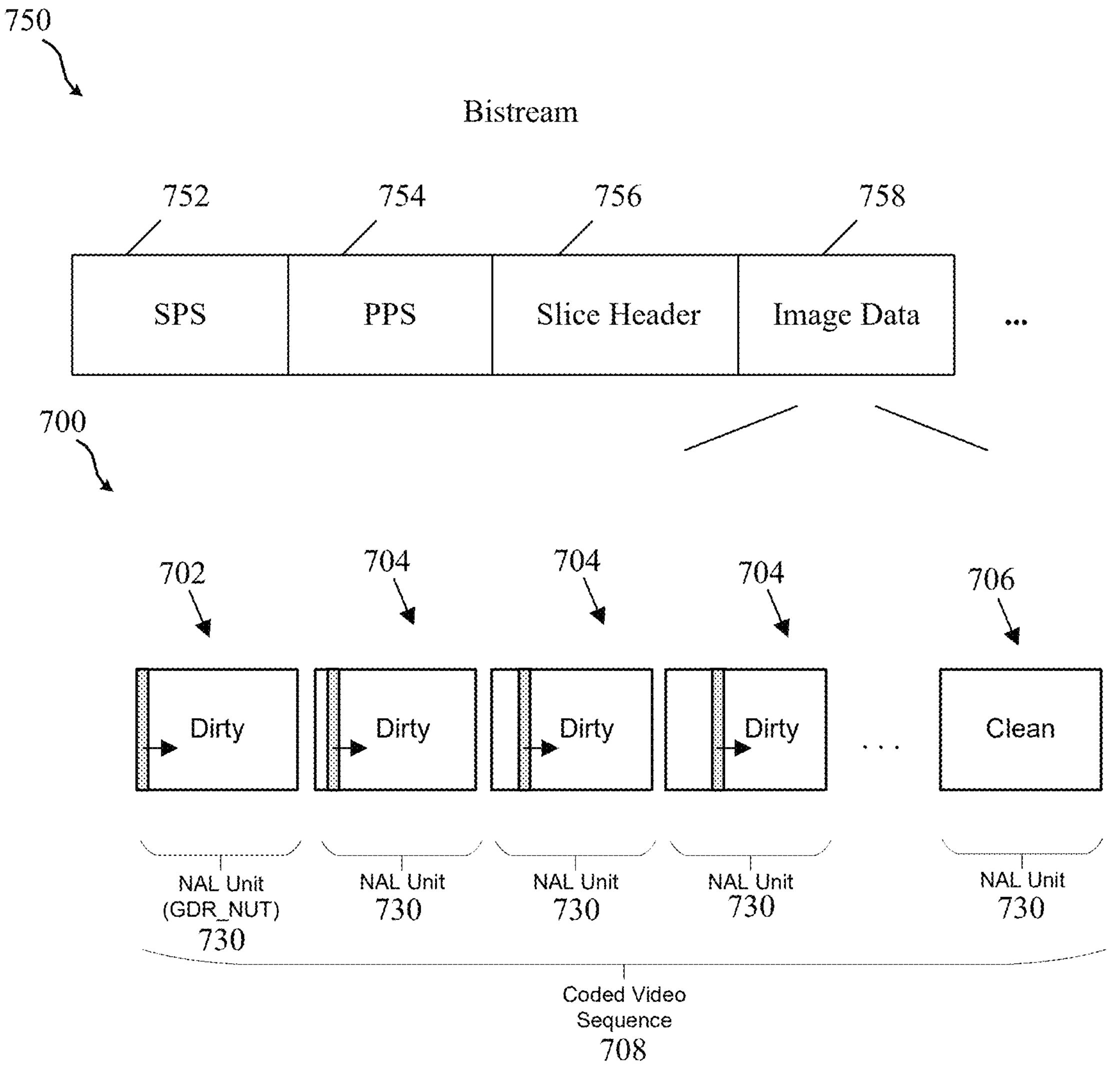
FIG. 7 illustrates a video bitstream configured to implement a clean random access (CRA) technique.

FIG. 7 illustrates a video bitstream 750 configured to implement a gradual decoding refresh (GDR) technique 700. As used herein the video bitstream 750 may also be referred to as a coded video bitstream, a bitstream, or variations thereof. As shown in FIG. 7, the bitstream 750 comprises a sequence parameter set (SPS) 752, a picture parameter set (PPS) 754, a slice header 756, and image data 758. The bitstream 750, the SPS 752, the PPS 754, and the slice header 756 in FIG. 7 are similar to the bitstream 550, the SPS 552, the PPS 554, and the slice header 556 of FIG. 5. Therefore, for the sake of brevity, a description of these elements will not be repeated.

The image data 758 of FIG. 7 comprises data associated with the images or video being encoded or decoded. The image data 758 may be simply referred to as the payload or data being carried in the bitstream 750. In an embodiment, the image data 758 comprises the CVS 708 (or CLVS) containing a GDR picture 702, one or more trailing pictures 704, and an end of sequence picture picture 706. In an embodiment, the GDR picture 702 is referred to as a CVSS picture. The decoding process for the CVS 708 always starts at the GDR picture 702.

As shown in FIG. 7, the GDR picture 702, the trailing pictures 704, and the end of sequence picture 706 in the CVS 708 are each contained within their own VCL NAL unit 730. The set of VCL NAL units 730 in the CVS 708 may be referred to as an access unit.

In the latest draft specification of VVC, output of prior pictures for IRAP pictures is specified as follows. The prior pictures (e.g., previously-decoded pictures) for an IRAP picture refer to those pictures that 1) are decoded earlier than the IRAP picture, 2) are indicated for output, 3) are present in the decoded picture buffer (DPB) at the beginning of decoding the IRAP picture, and 4) have not been output at the beginning of decoding the IRAP picture. As used herein, the prior pictures may be referred to as previously-decoded pictures.

The slice header syntax includes the syntax element no_output_of_prior_pics_flag for IDR and CRA pictures. The semantics are as follows:

no_output_of_prior_pics_flag affects the output of previously-decoded pictures in the decoded picture buffer after the decoding of an IDR picture that is not the first picture in the bitstream as specified in Annex C of VVC Draft 5.

Clause C.3.2 (Removal of pictures from the DPB before decoding of the current picture) in the VVC Draft 5 includes the following text:

When the current picture is an IRAP picture with NoIncorrectPicOutputFlag equal to 1 that is not picture 0, the following ordered steps are applied:

1. The variable NoOutputOfPriorPicsFlag is derived for the decoder under test as follows:

If the current picture is a CRA picture, NoOutputOfPriorPicsFlag is set equal to 1 (regardless of the value of no_output_of_prior_pics_flag).

Otherwise, if the value of pic_width_in_luma_samples, pic_height_in_luma_samples, chroma_format_idc, separate_colour_plane_flag, bit_depth_luma_minus8, bit_depth_chroma_minus8 or sps_max_dec_pic_buffering_minus1[HighestTid] derived from the active SPS is different from the value of pic_width_in_luma_samples, pic_height_in_luma_samples, chroma_format_idc, separate_colour_plane_flag, bit_depth_luma_minus8, bit_depth_chroma_minus8 or sps_max_dec_pic_buffering_minus1[HighestTid], respectively, derived from the SPS active for the preceding picture, NoOutputOfPriorPicsFlag may (but should not) be set to 1 by the decoder under test, regardless of the value of no_output_of_prior_pics_flag.

NOTE—Although setting NoOutputOfPriorPicsFlag equal to no_output_of_prior_pics_flag is preferred under these conditions, the decoder under test is allowed to set NoOutputOfPriorPicsFlag to 1 in this case.

Otherwise, NoOutputOfPriorPicsFlag is set equal to no_output_of_prior_pics_flag.

2. The value of NoOutputOfPriorPicsFlag derived for the decoder under test is applied for the hypothetical reference decoder (HRD), such that when the value of NoOutputOfPriorPicsFlag is equal to 1, all picture storage buffers in the DPB are emptied without output of the pictures they contain, and the DPB fullness is set equal to 0.

Clause C.5.2.2 (Output and removal of pictures from the DPB) of the VVC Draft 5 includes the following text:

If the current picture is an IRAP picture with NoIncorrectPicOutputFlag equal to 1 that is not picture 0, the following ordered steps are applied:

1. The variable NoOutputOfPriorPicsFlag is derived for the decoder under test as follows:

If the current picture is a CRA picture, NoOutputOfPriorPicsFlag is set equal to 1 (regardless of the value of no_output_of_prior_pics_flag).

Otherwise, if the value of pic_width_in_luma_samples, pic_height_in_luma_samples, chroma_format_idc, separate_colour_plane_flag, bit_depth_luma_minus8, bit_depth_chroma_minus8 or sps_max_dec_pic_buffering_minus1[HighestTid] derived from the active SPS is different from the value of pic_width_in_luma_samples, pic_height_in_luma_samples, chroma_format_idc, separate_colour_plane_flag, bit_depth_luma_minus8, bit_depth_chroma_minus8 or sps_max_dec_pic_buffering_minus1[HighestTid], respectively, derived from the SPS active for the preceding picture, NoOutputOfPriorPicsFlag may (but should not) be set to 1 by the decoder under test, regardless of the value of no_output_of_prior_pics_ flag.

NOTE—Although setting NoOutputOfPriorPicsFlag equal to no_output_of_prior_pics_flag is preferred under these conditions, the decoder under test is allowed to set NoOutputOfPriorPicsFlag to 1 in this case.

Otherwise, NoOutputOfPriorPicsFlag is set equal to no_output_of_prior_pics_flag.

2. The value of NoOutputOfPriorPicsFlag derived for the decoder under test is applied for the HRD as follows:

If NoOutputOfPriorPicsFlag is equal to 1, all picture storage buffers in the DPB are emptied without output of the pictures they contain and the DPB fullness is set equal to 0.

Otherwise (NoOutputOfPriorPicsFlag is equal to 0), all picture storage buffers containing a picture that is marked as "not needed for output" and "unused for reference" are emptied (without output) and all non-empty picture storage buffers in the DPB are emptied by repeatedly invoking the "bumping" process specified in clause C.5.2.4 and the DPB fullness is set equal to 0.

The problems of the existing designs are discussed.

In the latest draft specification of VVC, for a CRA picture with NoIncorrectPicOutputFlag equal to 1 (i.e., a CRA picture that starts a new CVS), the value of no_output_of_prior_pics_flag is not used, as the value of NoOutputOfPriorPicsFlag is set equal to 1 regardless of the value of no_output_of_prior_pics_flag. That means, the prior pictures of each CRA picture starting a CVS are not output. However, similarly as for an IDR picture, output/display of prior pictures can provide a more continuous playback and hence a better user experience as long as the DPB does not get overflowed when decoding the picture starting a new CVS and the subsequent pictures in decoding order.

In order to solve the problems discussed above, this disclosure provides the following inventive aspect. The value of no_output_of_prior_pics_flag is used in the specification of the output of prior pictures for each CRA picture that starts a new CVS and that is not the first picture in the bitstream. This enables a more continuous playback and hence a better user experience.

This disclosure also applies to other types of pictures that start a new CVS, e.g., a gradal random access (GRA) picture as currently specified in the latest VVC draft specification. In an embodiment, the GRA picture may be referred to or is synonymous with a GDR picture.

By way of example, when decoding a video bitstream, a flag corresponding to a clean random access (CRA) picture is signaled in the bitstream. The flag specifies whether decoded pictures in the decoded picture buffer that are decoded earlier than the CRA picture are output when the CRA picture starts a new coded video sequence. That is, when the value of the flag indicates that the prior pictures are output (e.g., when the value is equal to 0), outputting the prior pictures. In an embodiment, the flag is designated as no_output_of_prior_pics_flag.

As another example, when decoding a video bitstream, a flag corresponding to a gradual random access (GRA) picture is signaled in the bitstream. The flag specifies whether decoded pictures in the decoded picture buffer that are decoded earlier than the GRA picture are output when the GRA picture starts a new coded video sequence. That is, when the value of the flag indicates that the prior pictures are output (e.g., when the value is equal to 0), outputting the prior pictures. In an embodiment, the flag is designated as no_output_of_prior_pics_flag.

Disclosed herein are techniques for the output of prior pictures (e.g., previously-decoded pictures) in a decoded picture buffer (DPB) when a random access point picture (e.g., a clean random access (CRA) picture, a gradual random access (GRA) picture, or gradual decoding refresh (GDR) picture, a CVSS picture, etc.) other than an instantaneous decoder refresh (IDR) picture is encountered in decoding order. Emptying the previously-decoded pictures from the DPB when the random access point picture is reached prevents the DPB from overflowing and promotes a more continuous playback. Thus, the coder/decoder (a.k.a., "codec") in video coding is improved relative to current codecs. As a practical matter, the improved video coding process offers the user a better user experience when videos are sent, received, and/or viewed.

Figure 8:
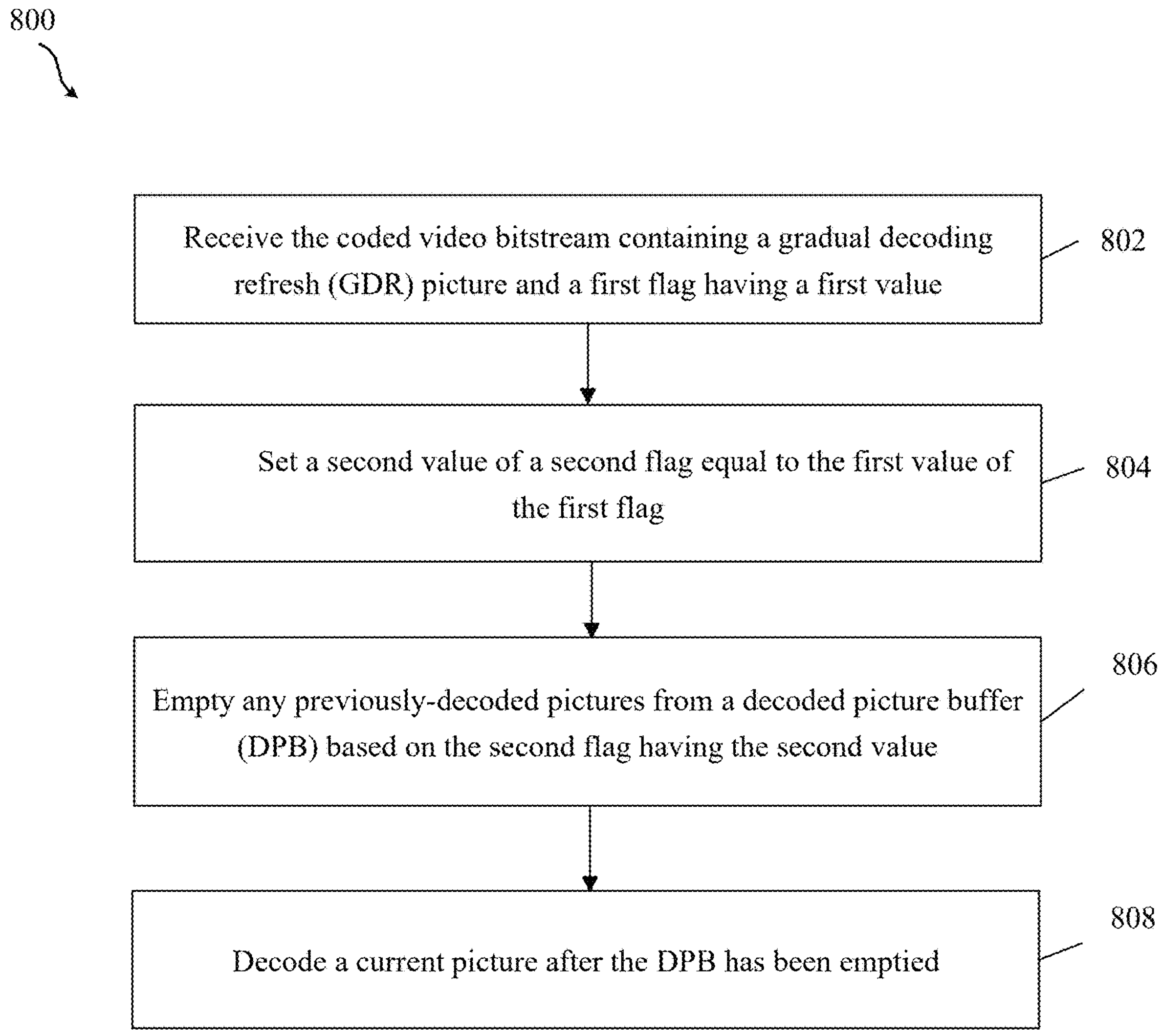
FIG. 8 is an embodiment of a method of decoding a coded video bitstream.

FIG. 8 is an embodiment of a method 800 of decoding a coded video bitstream implemented by a video decoder (e.g., video decoder 30). The method 800 may be performed after the decoded bitstream has been directly or indirectly received from a video encoder (e.g., video encoder 20). The method 800 improves the decoding process by emptying the DPB before a current picture is decoded when a random access point picture is encountered. The method 800 prevents the DPB from overflowing and promotes a more continuous playback. Therefore, as a practical matter, the performance of a codec is improved, which leads to a better user experience.

In block 802, the video decoder receives the coded video bitstream (e.g., the bitstream 750). The coded video bitstream contains a gradual decoding refresh (GDR) picture and a first flag having a first value. In an embodiment, the GDR picture is not a first picture of the coded video bitstream. In an embodiment, the first flag is designated as no_output_of_prior_pics_flag. In an embodiment, the GDR picture is disposed in a video coding layer (VCL) network abstraction layer (NAL) unit having a gradual decoding refresh (GDR) network abstraction layer (NAL) unit type (GDR_NUT).

In block 804, the video decoder sets a second value of a second flag equal to the first value of the first flag. In an embodiment, the second flag is designated as NoOutputOfPriorPicsFlag. In an embodiment, the second flag is internal to the decoder.

In block 806, the video decoder empties any previously-decoded pictures corresponding to the GDR picture from the DPB based on the second flag having the second value. In an embodiment, the previously-decoded pictures are emptied from the DPB after the GDR picture has been decoded. That is, the video decoder removes the previously-decoded pictures from the picture storage buffers in the DPB. In an embodiment, the previously-decoded pictures are not output or displayed when the previously-decoded pictures are removed from the DPB. In an embodiment, a DPB fullness parameter is set to zero when the first flag is set to the first value. The DPB fullness parameter indicates how many pictures are held in the DPB. Setting the DPB fullness parameter to zero signifies that the DPB is empty.

In block 808, the video decoder decodes a current picture after the DPB has been emptied. In an embodiment, the current picture is from the same CVS as the CRA picture and is obtained or encountered after the CRA in decoding order. In an embodiment, an image generated based on the current picture is displayed for a user of an electronic device (e.g., a smart phone, tablet, laptop, personal computer, etc.).

Figure 9:
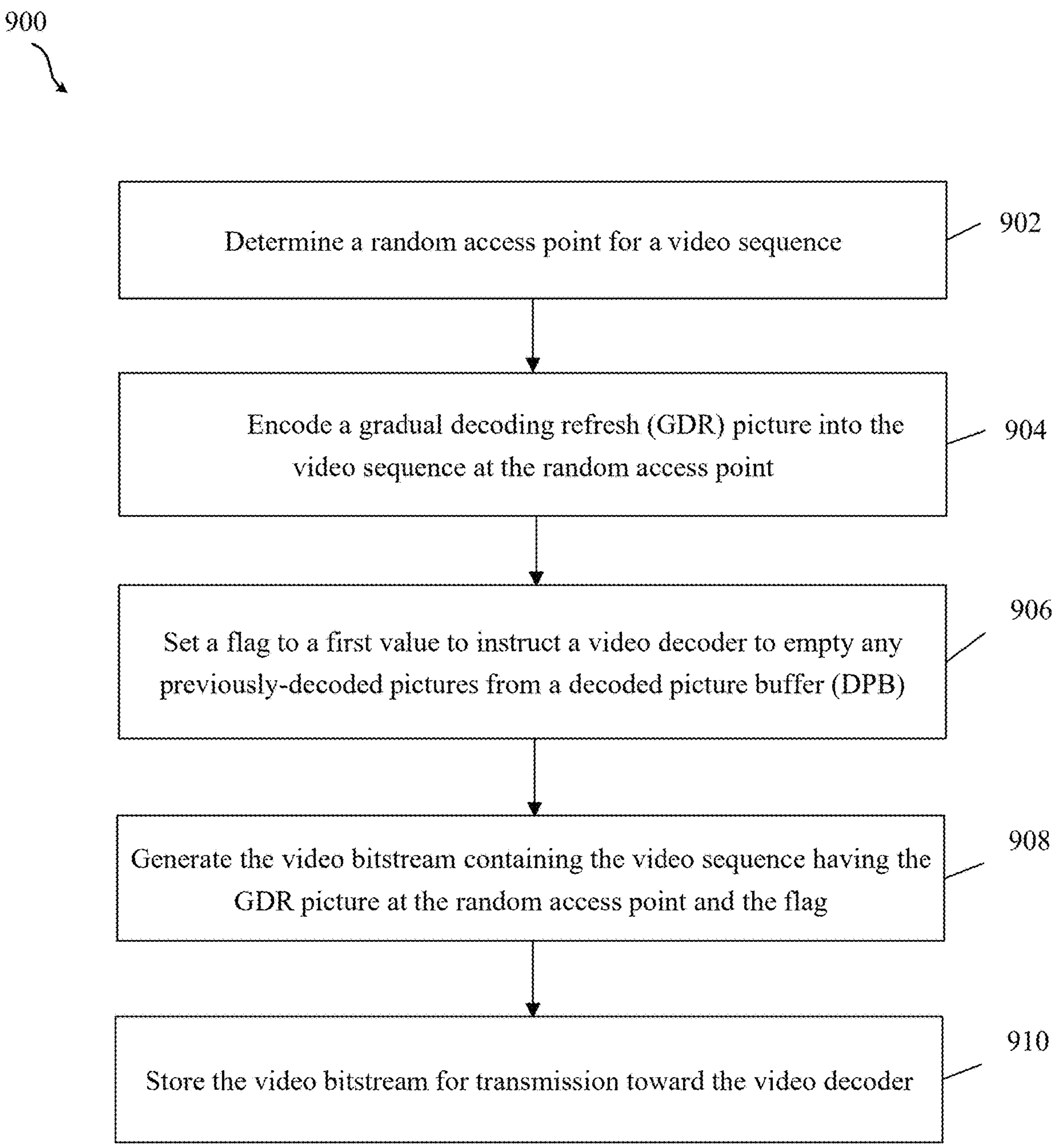
FIG. 9 is an embodiment of a method of encoding a coded video bitstream.

FIG. 9 is an embodiment of a method 900 of encoding a video bitstream implemented by a video encoder (e.g., video encoder 20). The method 900 may be performed when a picture (e.g., from a video) is to be encoded into a video bitstream and then transmitted toward a video decoder (e.g., video decoder 30). The method 900 improves the encoding process by instructing the video decoder to empty the DPB before a current picture is decoded when a random access point picture is encountered. The method 900 prevents the DPB from overflowing and promotes a more continuous playback. Therefore, as a practical matter, the performance of a codec is improved, which leads to a better user experience.

In block 902, the video encoder determines a random access point for a video sequence. In block 904, the video encoder encodes a gradual decoding refresh (GDR) picture into the video sequence at the random access point. In an embodiment, the GDR picture is not a first picture of the video bitstream. In an embodiment, the GDR picture is disposed in a video coding layer (VCL) network abstraction layer (NAL) unit having a gradual decoding refresh (GDR) network abstraction layer (NAL) unit type (GDR_NUT).

In block 906, the video encoder sets a flag to a first value to instruct a video decoder to empty any previously-decoded pictures from a decoded picture buffer (DPB). In an embodiment, the video decoder is instructed to empty any previously-decoded pictures from the DPB after the GDR picture has been decoded. In an embodiment, the flag is designated as no_output_of_prior_pics_flag. In an embodiment, the video encoder instructs the video decoder to set a DPB fullness parameter to zero when the flag is set to the first value. In an embodiment, the first value of the flag is one.

In block 908, the video encoder generates the video bitstream containing the video sequence having the GDR picture at the random access point and the flag. In block 910, the video encoder stores the video bitstream for transmission toward the video decoder.

The following syntax and semantics may be employed to implement the embodiments disclosed herein. The following description is relative to the basis text, which is the latest VVC draft specification. In other words, only the delta is described, while the text in the basis text that are not mentioned below apply as they are. Added text relative to the basis text is shown in bold, and removed text is shown in italics.

General Slice Header Syntax (7.3.5.1 in VVC)

| | Descriptor |
|---|---|
| slice_header( ) { | |
| ... | |
| if( NalUnitType = = IDR_W_RADL \|\| NalUnitType = = IDR_N_LP \|\| NalUnitType = = CRA_NUT \|\| **NalUnitType = = GRA_NUT** ) | |
| no_output_of_prior_pics_flag | u(1) |
| ... | |

General Slice Header Semantics (7.4.6.1 in VVC)

When present, the value of each of the slice header syntax elements slice_pic_parameter_set_id, slice_pic_order_cnt_lsb, no_output_of_prior_pics_flag, and slice_temporal_mvp_enabled_flag shall be the same in all slice headers of a coded picture.

. . .

no_output_of_prior_pics_flag affects the output of previously-decoded pictures in the decoded picture buffer after the decoding of an IDR picture a CVSS picture that is not the first picture in the bitstream as specified in Annex C.

Removal of pictures from the DPB before decoding of the current picture (C.3.2 in VVC).

. . .

When the current picture is an IRAP picture with NoIncorrectPicOutputFlag equal to 1 a CVSS picture that is not picture 0, the following ordered steps are applied:

1. The variable NoOutputOfPriorPicsFlag is derived for the decoder under test as follows:

If the current picture is a CRA picture, NoOutputOfPriorPicsFlag is set equal to 1 (regardless of the value of no_output_of_prior_pics_flag).

Otherwise, if If the value of pic_width_in_luma_samples, pic_height_in_luma_samples, chroma_format_idc, separate_colour_plane_flag, bit_depth_luma_minus8, bit_depth_chroma_minus8 or sps_max_dec_pic_buffering_minus1[HighestTid] derived from the active SPS is different from the value of pic_width_in_luma_samples, pic_height_in_luma_samples, chroma_format_idc, separate_colour_plane_flag, bit_depth_luma_minus8, bit_depth_chroma_minus8 or sps_max_dec_pic_buffering_minus1[HighestTid], respectively, derived from the SPS active for the preceding picture, NoOutputOfPriorPicsFlag may (but should not) be set to 1 by the decoder under test, regardless of the value of no_output_of_prior_pics_flag.

NOTE—Although setting NoOutputOfPriorPicsFlag equal to no_output_of_prior_pics_flag is preferred under these conditions, the decoder under test is allowed to set NoOutputOfPriorPicsFlag to 1 in this case.

Otherwise, NoOutputOfPriorPicsFlag is set equal to no_output_of_prior_pics_flag.

2. The value of NoOutputOfPriorPicsFlag derived for the decoder under test is applied for the HRD, such that when the value of NoOutputOfPriorPicsFlag is equal to 1, all picture storage buffers in the DPB are emptied without output of the pictures they contain, and the DPB fullness is set equal to 0.

Figure 10:
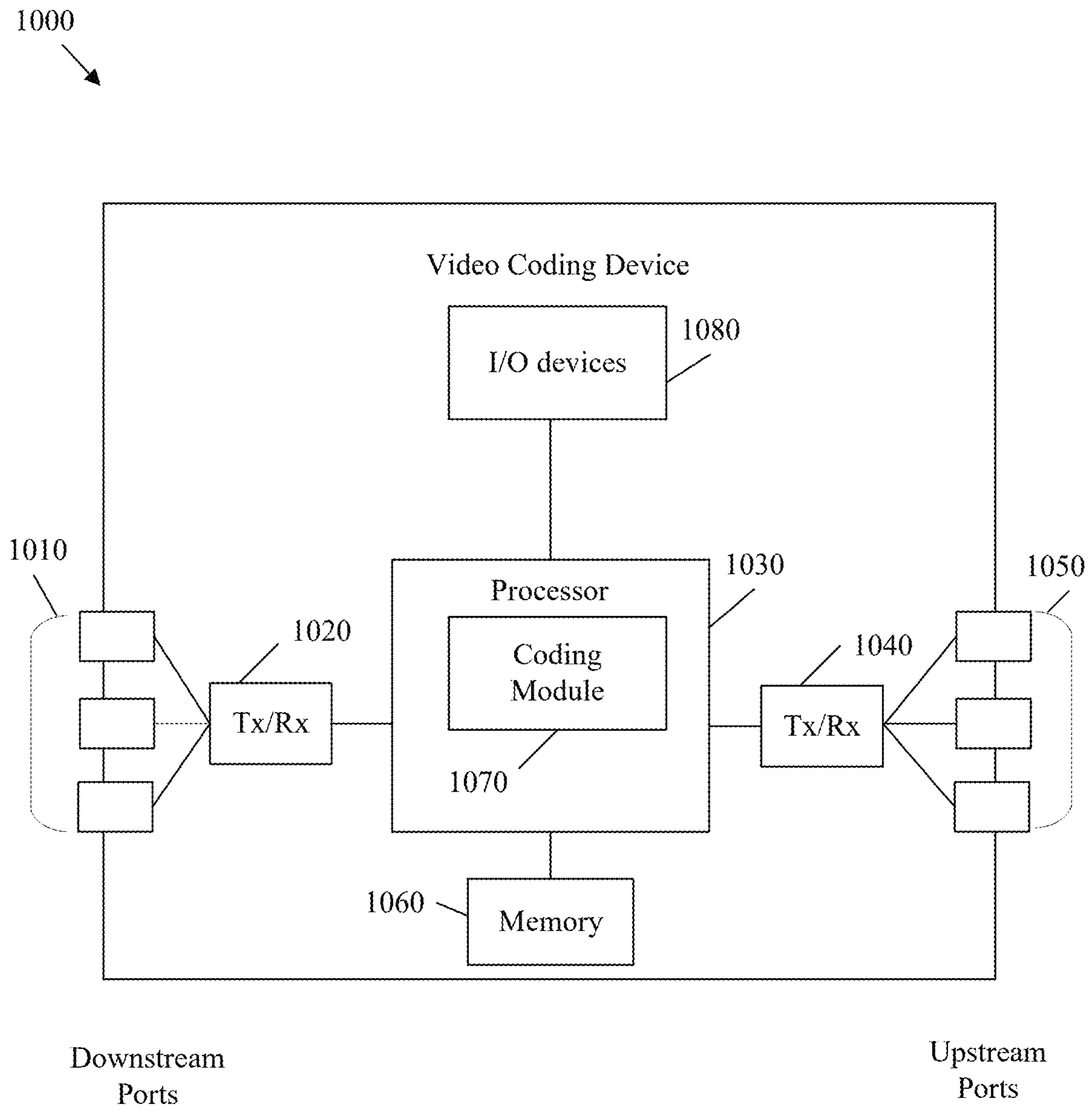
FIG. 10 is a schematic diagram of a video coding device.

FIG. 10 is a schematic diagram of a video coding device 1000 (e.g., a video encoder 20 or a video decoder 30) according to an embodiment of the disclosure. The video coding device 1000 is suitable for implementing the disclosed embodiments as described herein. The video coding device 1000 comprises ingress ports 1010 and receiver units (Rx) 1020 for receiving data; a processor, logic unit, or central processing unit (CPU) 1030 to process the data; transmitter units (Tx) 1040 and egress ports 1050 for transmitting the data; and a memory 1060 for storing the data. The video coding device 1000 may also comprise optical-to-electrical (OE) components and electrical-to-optical (EO) components coupled to the ingress ports 1010, the receiver units 1020, the transmitter units 1040, and the egress ports 1050 for egress or ingress of optical or electrical signals.

The processor 1030 is implemented by hardware and software. The processor 1030 may be implemented as one or more CPU chips, cores (e.g., as a multi-core processor), field-programmable gate arrays (FPGAs), application specific integrated circuits (ASICs), and digital signal processors (DSPs). The processor 1030 is in communication with the ingress ports 1010, receiver units 1020, transmitter units 1040, egress ports 1050, and memory 1060. The processor 1030 comprises a coding module 1070. The coding module 1070 implements the disclosed embodiments described above. For instance, the coding module 1070 implements, processes, prepares, or provides the various codec functions. The inclusion of the coding module 1070 therefore provides a substantial improvement to the functionality of the video coding device 1000 and effects a transformation of the video coding device 1000 to a different state. Alternatively, the coding module 1070 is implemented as instructions stored in the memory 1060 and executed by the processor 1030.

The video coding device 1000 may also include input and/or output (I/O) devices 1080 for communicating data to and from a user. The I/O devices 1080 may include output devices such as a display for displaying video data, speakers for outputting audio data, etc. The I/O devices 1080 may also include input devices, such as a keyboard, mouse, trackball, etc., and/or corresponding interfaces for interacting with such output devices.

The memory 1060 comprises one or more disks, tape drives, and solid-state drives and may be used as an overflow data storage device, to store programs when such programs are selected for execution, and to store instructions and data that are read during program execution. The memory 1060 may be volatile and/or non-volatile and may be read-only memory (ROM), random access memory (RAM), ternary content-addressable memory (TCAM), and/or static random-access memory (SRAM).

Figure 11:
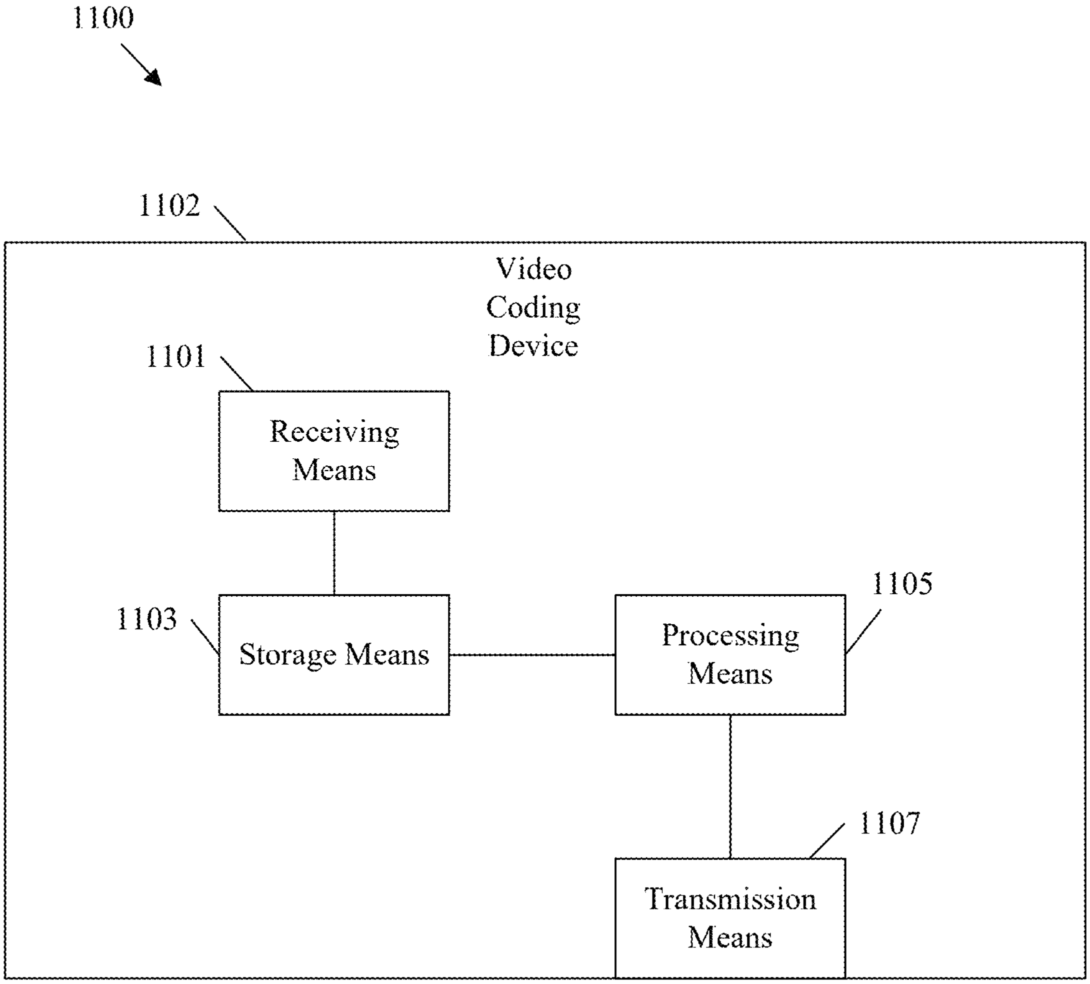
FIG. 11 is a schematic diagram of an embodiment of a means for coding.

FIG. 11 is a schematic diagram of an embodiment of a means for coding 1100. In an embodiment, the means for coding 1100 is implemented in a video coding device 1102 (e.g., a video encoder 20 or a video decoder 30). The video coding device 1102 includes receiving means 1101. The receiving means 1101 is configured to receive a picture to encode or to receive a bitstream to decode. The video coding device 1102 includes transmission means 1107 coupled to the receiving means 1101. The transmission means 1107 is configured to transmit the bitstream to a decoder or to transmit a decoded image to a display means (e.g., one of the I/O devices 1080).

The video coding device 1102 includes a storage means 1103. The storage means 1103 is coupled to at least one of the receiving means 1101 or the transmission means 1107. The storage means 1103 is configured to store instructions. The video coding device 1102 also includes processing means 1105. The processing means 1105 is coupled to the storage means 1103. The processing means 1105 is configured to execute the instructions stored in the storage means 1103 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A non-transitory computer-readable storage medium storing instructions that, when executed by one or more processors, cause a video processing apparatus to:

receive a coded video bitstream, wherein the coded video bitstream contains a gradual decoding refresh (GDR) picture and a first flag having a value;

set a value of a second flag equal to the value of the first flag, wherein the value of the second flag derived for a video decoder under test is applied for a hypothetical reference decoder (HRD); and when the value of the second flag is equal to one, empty all picture storage buffers in a decoded picture buffer (DPB) without output of pictures contained in the DPB and set a DPB fullness parameter to zero.

2. The non-transitory computer-readable storage medium of claim 1, wherein the GDR picture is not a first picture of the coded video bitstream.

3. The non-transitory computer-readable storage medium of claim 1, wherein the GDR picture is disposed in a video coding layer (VCL) network abstraction layer (NAL) unit having a GDR NAL unit type (GDR_NUT).

4. The non-transitory computer-readable storage medium of claim 1, further comprising setting the DPB fullness parameter to zero when the value of the first flag is set to one.

5. The non-transitory computer-readable storage medium of claim 1, wherein the first flag is designated as no_output_of_prior_pics_flag and the second flag is designated as NoOutputOfPriorPicsFlag.

6. The non-transitory computer-readable storage medium of claim 1, wherein the DPB is emptied after the GDR picture has been decoded.

7. The non-transitory computer-readable storage medium of claim 1, further comprising displaying an image generated based on a current picture.

8. A non-transitory computer-readable medium storing a bitstream and one or more instructions executable by at least one processor to perform operations of encoding or decoding of the bitstream, the operations comprising:

receiving a coded video bitstream, wherein the coded video bitstream contains a gradual decoding refresh (GDR) picture and a first flag having a value;

setting a value of a second flag equal to the value of the first flag, wherein the value of the second flag derived for a decoding device under test is applied for a hypothetical reference decoder (HRD); and when the value of the second flag is equal to one, emptying all picture storage buffers in a decoded picture buffer (DPB) without output of pictures contained in the DPB and setting a DPB fullness parameter to zero.

9. The non-transitory computer-readable storage medium of claim 8, wherein the GDR picture is not a first picture of the coded video bitstream.

10. The non-transitory computer-readable storage medium of claim 8, wherein the first flag is designated as no_output_of_prior_pics_flag, and wherein the second flag is designated as NoOutputOfPriorPicsFlag.

11. The non-transitory computer-readable storage medium of claim 8, further comprising a display configured to display an image as generated based on a current picture.

12. A method of encoding implemented by a video encoder, the method comprising:

determining a random access point for a video sequence;

encoding a gradual decoding refresh (GDR) picture into the video sequence at the random access point;

set a value of a second flag equal to a value of a flag;

applying the value of the second flag derived for a decoder under test for a hypothetical reference decoder (HRD), wherein the value of the second flag instructs a video decoder to empty all picture storage buffers in a decoded picture buffer (DPB) without output of the pictures contained in the DPB and to set a DPB fullness parameter to zero when the value of the second flag is equal to one; and generating a video bitstream containing the video sequence having the GDR picture at the random access point and the flag.

13. The method of claim 12, wherein the GDR picture is not a first picture of the video bitstream, and wherein the video decoder is instructed to empty the DPB after the GDR picture has been decoded.

14. The method of claim 12, wherein the GDR picture is disposed in a video coding layer (VCL) network abstraction layer (NAL) unit having a gradual decoding refresh (GDR) network abstraction layer (NAL) unit type (GDR_NUT).

15. The method of claim 12, wherein the flag is designated as no_output_of_prior_pics_flag.

16. The method of claim 12, wherein the value of the flag is one.

17. An encoding device, comprising:

a memory containing instructions;

a processor coupled to the memory, the processor configured to implement the instructions to cause the encoding device to:

determine a random access point for a video sequence;

encode a gradual decoding refresh (GDR) picture into the video sequence at the random access point;

set a value of a second flag equal to a value of a flag;

apply the value of the second flag derived for a decoder under test for a hypothetical reference decoder (HRD), wherein the value of the second flag instructs a video decoder to empty all picture storage buffers in a decoded picture buffer (DPB) without output of the pictures contained in the DPB and to set a DPB fullness parameter to zero when the value of the second flag is equal to one; and generate a video bitstream containing the video sequence having the GDR picture at the random access point and the flag.

18. The encoding device of claim 17, wherein the GDR picture is not a first picture of the video bitstream, and wherein the video decoder is instructed to empty the DPB after the GDR picture has been decoded.

19. The encoding device of claim 17, wherein the GDR picture is disposed in a video coding layer (VCL) network abstraction layer (NAL) unit having a gradual decoding refresh (GDR) network abstraction layer (NAL) unit type (GDR_NUT).

20. The encoding device of claim 17, wherein the value of the flag is one.

* * * * *